United States Patent
Brown

(10) Patent No.: US 8,565,998 B2
(45) Date of Patent: Oct. 22, 2013

(54) GAS TURBINE ENGINE HAVING ON-ENGINE DATA STORAGE DEVICE

(75) Inventor: Rork S. Brown, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 2025 days.

(21) Appl. No.: 11/604,567

(22) Filed: Nov. 27, 2006

(65) Prior Publication Data

US 2008/0125950 A1    May 29, 2008

(51) Int. Cl.
*G06F 19/00* (2011.01)
*G06G 7/70* (2006.01)

(52) U.S. Cl.
USPC ............... 701/100; 701/9; 701/99; 701/29.1; 701/29.6; 701/31.3; 701/31.4; 701/33.2; 701/34.2; 701/34.4

(58) Field of Classification Search
None
See application file for complete search history.

(56) References Cited

U.S. PATENT DOCUMENTS

| | | | | |
|---|---|---|---|---|
| 3,829,842 A * | 8/1974 | Langdon et al. | | 700/159 |
| 3,892,975 A * | 7/1975 | Yannone et al. | | 290/40 R |
| 4,280,185 A | 7/1981 | Martin | | |
| 4,787,053 A * | 11/1988 | Moore | | 701/123 |
| 5,239,468 A * | 8/1993 | Sewersky et al. | | 701/35 |
| 5,931,877 A * | 8/1999 | Smith et al. | | 701/29 |
| 6,115,666 A | 9/2000 | Ng | | |
| 6,216,066 B1 * | 4/2001 | Goebel et al. | | 701/29 |
| 6,292,723 B1 * | 9/2001 | Brogan et al. | | 701/29 |
| 6,294,988 B1 * | 9/2001 | Shomura | | 340/438 |
| 6,343,251 B1 * | 1/2002 | Herron et al. | | 701/100 |
| 6,556,902 B2 * | 4/2003 | Ing et al. | | 701/29 |
| 6,574,537 B2 * | 6/2003 | Kipersztok et al. | | 701/29 |
| 6,603,394 B2 * | 8/2003 | Raichle et al. | | 340/438 |
| 6,636,813 B1 * | 10/2003 | Isobe et al. | | 702/34 |
| 6,691,064 B2 * | 2/2004 | Vroman | | 702/183 |
| 6,839,710 B2 | 1/2005 | Dabbish et al. | | |
| 6,850,869 B2 * | 2/2005 | Pierro et al. | | 702/184 |
| 6,853,959 B2 * | 2/2005 | Ikeda et al. | | 702/188 |
| 6,907,416 B2 * | 6/2005 | Tasooji et al. | | 706/50 |
| 7,027,953 B2 * | 4/2006 | Klein | | 702/184 |
| 7,167,788 B2 * | 1/2007 | Loda et al. | | 701/100 |
| 7,177,731 B2 * | 2/2007 | Sandell et al. | | 701/3 |
| 7,231,180 B2 * | 6/2007 | Benson et al. | | 455/41.2 |
| 7,280,941 B2 * | 10/2007 | Bonanni et al. | | 702/189 |
| 2003/0083794 A1 * | 5/2003 | Halm et al. | | 701/29 |
| 2004/0003318 A1 * | 1/2004 | Felke et al. | | 714/25 |
| 2005/0096873 A1 * | 5/2005 | Klein | | 702/184 |
| 2006/0168090 A1 * | 7/2006 | Loda et al. | | 709/208 |

OTHER PUBLICATIONS

"What Goes There? Tagging aircraft parts and other applications of radio-frequency identification are more than chip shots," James Ott/ Louisville, Kentucky.
Aviation Week & Space Technology/Nov. 13, 2006, p. 41.

* cited by examiner

*Primary Examiner* — Bhavesh V Amin
(74) *Attorney, Agent, or Firm* — Carlson, Gaskey & Olds, P.C.

(57) ABSTRACT

An on-engine data storage device for a gas turbine engine includes a housing, an interface device, and a memory device. The interface device can communicate with a peripheral device. The memory device is mounted within the housing and is operable to store engine data related to the gas turbine engine.

7 Claims, 3 Drawing Sheets

GAS TURBINE ENGINE HAVING ON-ENGINE DATA STORAGE DEVICE

BACKGROUND OF THE INVENTION

This invention generally relates to gas turbine engines, and more particularly to a data storage device for storing data related to the gas turbine engine.

Modern gas turbine engines typically include a plurality of engine sections which are constructed on a modular basis. For example, a typical gas turbine engine includes at least a compressor section, a combustor section, and a turbine section. Each of these engine sections include numerous parts. In addition, gas turbine engines include numerous other components including electronic engine components, nacelle assemblies, and the like.

Engine data, including engine history data, parts history data and other information, is currently maintained for engines in service. The engine data is typically recorded manually in notebooks or the like. Relevant information pertaining to the engine including maintenance information and the years of life of the engine and its components, for example, must be hand recorded to track the life history of the engine. Disadvantageously, the notebook containing the life history of the engine may become misplaced. Misplacement of the engine data is further compounded due to the transient nature of gas turbine engines during their service life. For example, a gas turbine engine may be used by several different airlines and on multiple aircraft during its service life.

In addition, human error is inherent in recording the engine data in this manner. For example, failure to record relevant engine data may result where multiple individuals perform maintenance on the engine.

Accordingly, it is desirable to provide a gas turbine engine having a data storage device which provides an improved process for recording engine data and that reduces the opportunity for human error in recording the engine data.

SUMMARY OF THE INVENTION

An on-engine data storage device for a gas turbine engine includes a housing, an interface device that can communicate with a peripheral device, and a memory device mounted within the housing. The memory device is operable to store engine data related to the gas turbine engine.

A gas turbine engine includes a compressor, a combustor, a turbine, and a data storage device removably mounted to the gas turbine engine. The data storage device is operable to store engine data related to the gas turbine engine.

A method of recording the life history of a gas turbine engine includes tracking engine data and uploading the engine data onto a data storage device mounted to the gas turbine engine.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
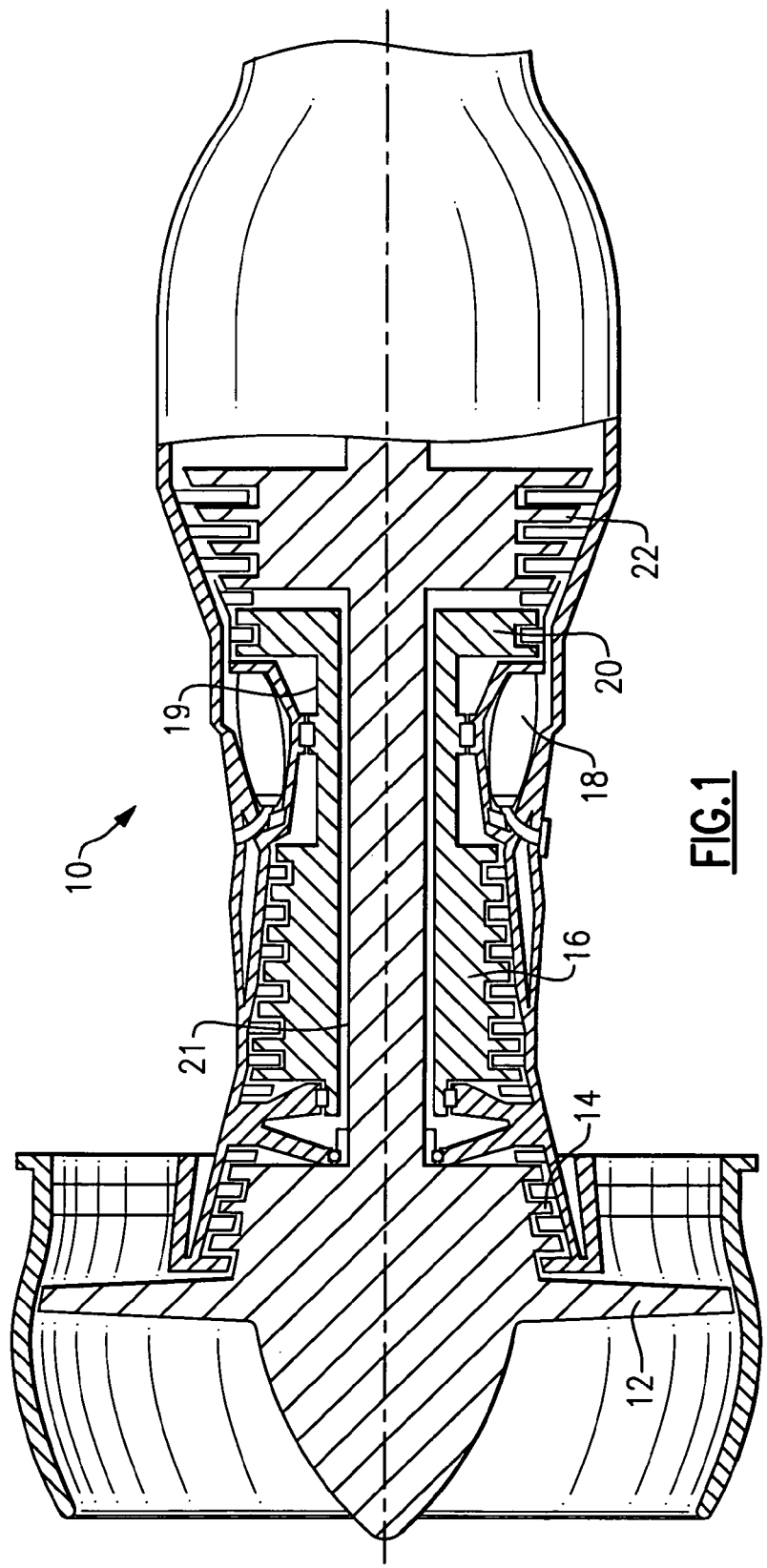
FIG. 1 illustrates a general perspective view of a gas turbine engine.

FIG. 1 illustrates a gas turbine engine 10 which includes (in serial flow communication) a fan section 12, a low pressure compressor 14, a high pressure compressor 16, a combustor 18, a high pressure turbine 20, and a low pressure turbine 22. During operation, air is pulled into the gas turbine engine 10 by the fan section 12 and is pressurized in the compressors 14, 16, mixed with fuel and burned in the combustor 18. The hot combustion gases flow through the high and low pressure turbines 20, 22, which extract energy from the hot combustion gases. The high pressure turbine 20 powers the high pressure compressor 16 through a high speed shaft 19 and a low pressure turbine 22 powers the fan section 12 and a low pressure compressor 14 though a low speed shaft 21. The invention is not limited to the two spool axial gas turbine architecture described and may be used with other architectures such as a single spool axial design, a three spool axial design and other architectures. That is, the present invention is applicable to any gas turbine engine.

Figure 2:
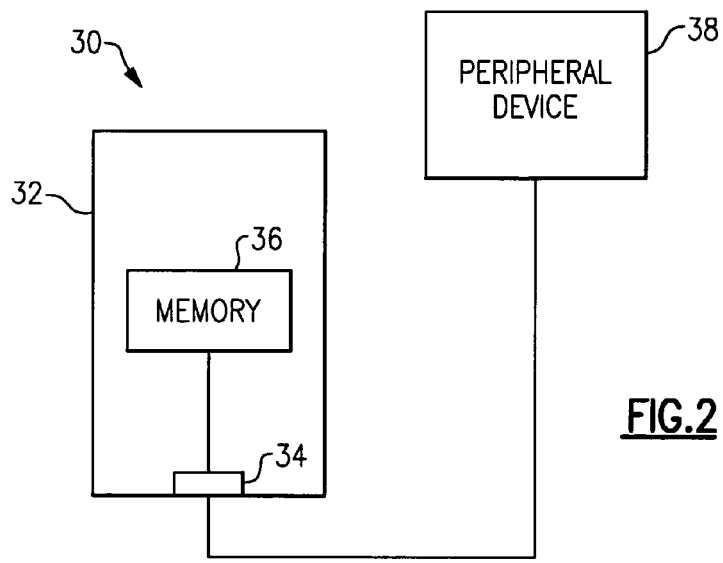
FIG. 2 illustrates a schematic representation of a data storage device for a gas turbine engine.

FIG. 2 illustrates an example data storage device 30. The data storage device 30 generally includes a housing 32, an interface device 34 and a memory device 36. The data storage device 30 resides on the gas turbine engine 10, as is further discussed below. The housing 32 protects the internal components of the data storage device 30 from damage. The data storage device 30 is shown schematically to better illustrate its function. The actual size and shape of the data storage device will vary depending upon design specific parameters including the mounting location of the data storage device 30 relative to the gas turbine engine 10.

The interface device 34 establishes a connection between the data storage device 30 and a peripheral device 38 such that information may be exchanged therebetween. In one example, the interface device 34 includes a universal serial bus (USB). However, any known interface device 34 may be included on the data storage device 30. The peripheral device 38 is a personal computer, in one example. In another example, the peripheral device 38 is a cellular phone. The peripheral device 38 may include any other device capable of connection to the data storage device 30 to facilitate an exchange of information therebetween including engine control units, data processors or the like. In this example, the data storage device 30 does not include its own power source, although devices with their own power source are also possible.

The memory device 36 is mounted within the housing 32. In one example, the memory device 36 includes random access memory (RAM). In another example, the memory device 36 includes read only memory (ROM). It should be understood that the memory device 36 may include any other memory storage device including but not limited to a hard drive, CD ROM, optically readable storage, magnetic storage or integrated circuit.

The data storage device 30 is operable to store engine data related to the gas turbine engine 10. In one example, the engine data includes engine history data. Engine history data includes, but is not limited to, the travel history of the gas turbine engine 10, maintenance information of the gas turbine engine 10 (i.e., maintenance activities performed on the engine 10), any information relating to performance of the engine 10, the years of life of the engine 10, the airlines which have used the engine 10, emissions information related to the engine 10, etc. In another example, the engine data includes engine parts data. Engine parts data includes any information related to parts replaced on the gas turbine engine 10 and maintenance performed on parts of the gas turbine engine 10. That is, the engine parts data relates to any type of maintenance information of the gas turbine engine 10 and its components. It should be understood that the engine data may include any other type of information related to the gas turbine engine 10. All relevant engine data may be stored on the data storage device 30.

Figure 3A:
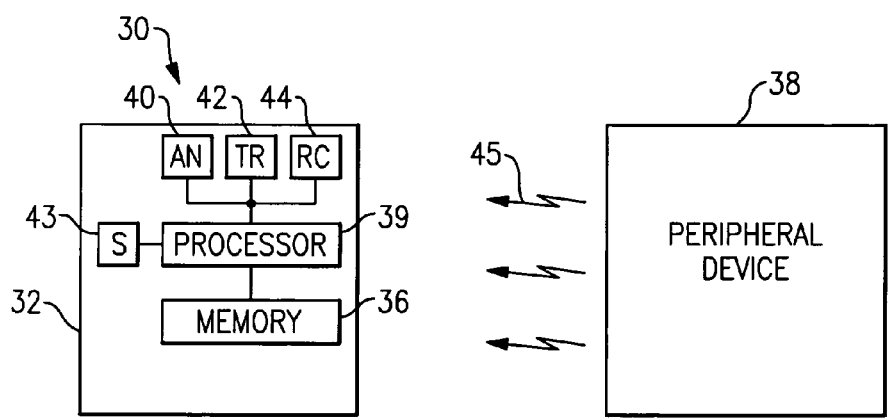
FIG. 3A illustrates another embodiment of the data storage device.

In the example illustrated in FIG. 3A, data storage device 30 communicates with the peripheral device 38 via wireless transmissions 45 to store the engine data on the memory device 36. In this example, the data storage device 30 includes a microprocessor 39, an antenna (AN) 40, a wireless transceiver (TR) 42 and a wireless receiver (RC) 44 for wirelessly transmitting and receiving wireless transmissions 45 between the data storage device 30 and the peripheral device 38. One of ordinary skill in the art would be able to program the data storage device 30 to provide wireless communication between the data storage device 30 and the peripheral device 38. The wireless transmissions 45 enable the engine data to be stored and retrieved on the data storage device 30 without the need to provide a wired connection to a peripheral device 38.

The data storage device 30 may optionally include a sensor system (S) 43. The sensor system 43 protects the engine data stored within the data storage device 30 and limits access to the engine data to certified users only. The sensor system 43 may include a biometric fingerprint authentication system, in one example. In another example, the data storage device 30 may be programmed to require password authentication. A person of ordinary skill in the art would know how to implement security features to protect the engine data stored on the data storage device 30.

The data storage device 30 may also optionally be utilized in combination with known Unique Identification (UID) and/or Radio Frequency Identification (RFID) part tracking systems. UID systems mark each part with a permanent 2-dimensional data matrix to track the parts. RFID systems are automatic identification systems relying on storing and remotely retrieving data using devices called RFID tags or transponders.

Figure 3B:
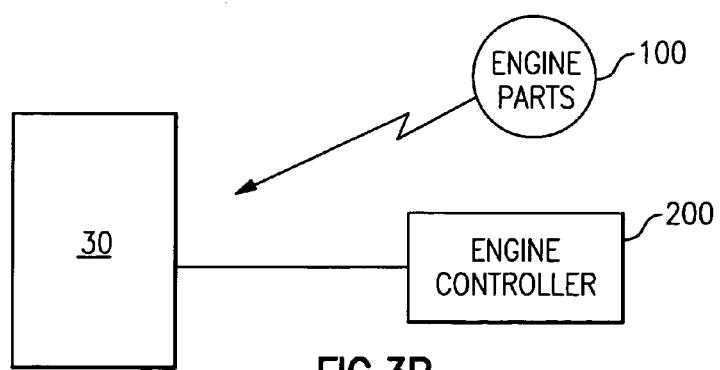
FIG. 3B illustrates yet another embodiment of the data storage device.

For example, as illustrated in FIG. 3B, the numerous parts 100 of a gas turbine engine 10 may include electronic identifiers which include component information such as date of manufacture, part number, serial number, and the like. The data storage device 30 could be programmed to communicate with the engine parts 100 having electronic identifiers to provide a combined part tracking/engine history tracking system. Further, the data storage device 30 could be programmed to communicate with existing engine controllers 200. For example, the engine controllers 200 could automatically communicate information, such as engine mileage, gas efficiency and the like, to the data storage device 30 upon return from flight to provide further advanced engine history information.

Utilizing the data storage device 30 in this manner would further automate the process of recording the life history of the gas turbine engine 10 and reduce the human error which is inherent in current methods of tracking engine history. A worker of ordinary skill in the art would understand how to program the example data storage device 30 to communicate with known part tracking systems as well as other engine systems.

Figure 4:
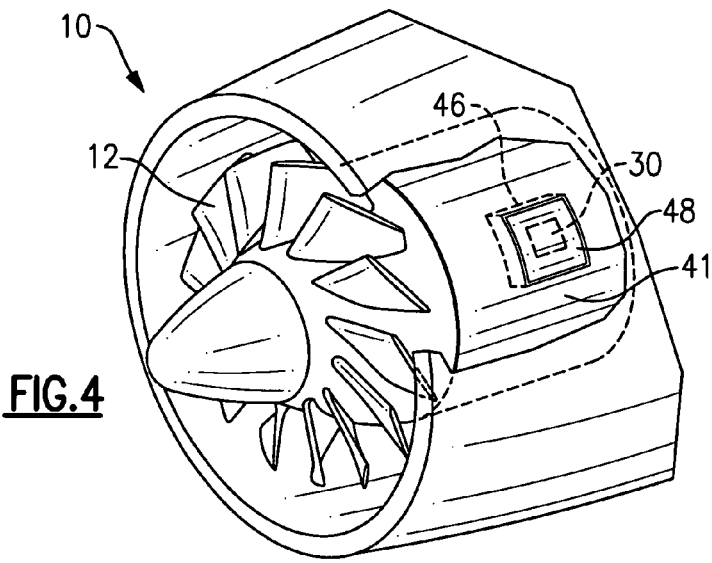
FIG. 4 illustrates an example mounting location of the data storage device.

FIG. 4 illustrates the data storage device 30 mounted to the gas turbine engine 10. In one example, the data storage device 30 is mounted to a core cowl 41 of the gas turbine engine 10. In another example, the data storage device 30 is mounted to any static portion of the gas turbine engine 10 exterior. The data storage device 30 may be mounted at any other location of the gas turbine engine 10 which is consistent with the operating requirements of the data storage device 30. For example, it may be desirable to shield the data storage device 30 from large fluctuations of temperature. The possibility of damage to the data storage device 30 is reduced by limiting the extreme temperature fluctuations that the data storage device 30 is subjected to.

The data storage device 30 may be removed from its mounting location on the gas turbine engine 10 to connect with the peripheral device 38. However, the data storage device 30 is retained on the gas turbine engine 10 at all other relevant times. The relevant life history of the engine 10 is conveniently stored in a known location relative to the gas turbine engine 10 such that the engine data stored on the data storage device 30 is readily accessible. That is, the relevant engine data of the engine 10 will always be located with the engine 10.

For example, a fan blade in the fan section 12 of the gas turbine engine 10 may require replacement. Upon completion of the part replacement, an engine maintenance person enters the appropriate information, such as the work performed, the parts replaced, date, etc., on a peripheral device 38 (i.e., a cellular phone or a computer). Next, the engine maintenance person connects the peripheral device 38 to the data storage device 30 (either wirelessly or by using a wired connection). The peripheral device recognizes the data storage device 30 and the information entered on the peripheral device 38 is then saved to the memory 36 of the data storage device 30. A worker of ordinary skill in the art would recognize how to save the engine data onto the memory 36 of the data storage device 30.

The data storage device 30 is mounted within a cavity 46 of the gas turbine engine 10. In this example, the mounting location is within the cavity 46 of the core cowl 41 of the gas turbine engine 10. The cavity 46 includes a cover 48 to conceal the data storage device 30. In one example, the cover 48 includes a dielectric (i.e., an electrical insulator) which shields the data storage device 30 from damage that may result from flying debris, electrical shock and/or excessive fluctuations of engine temperatures.

Figure 5:
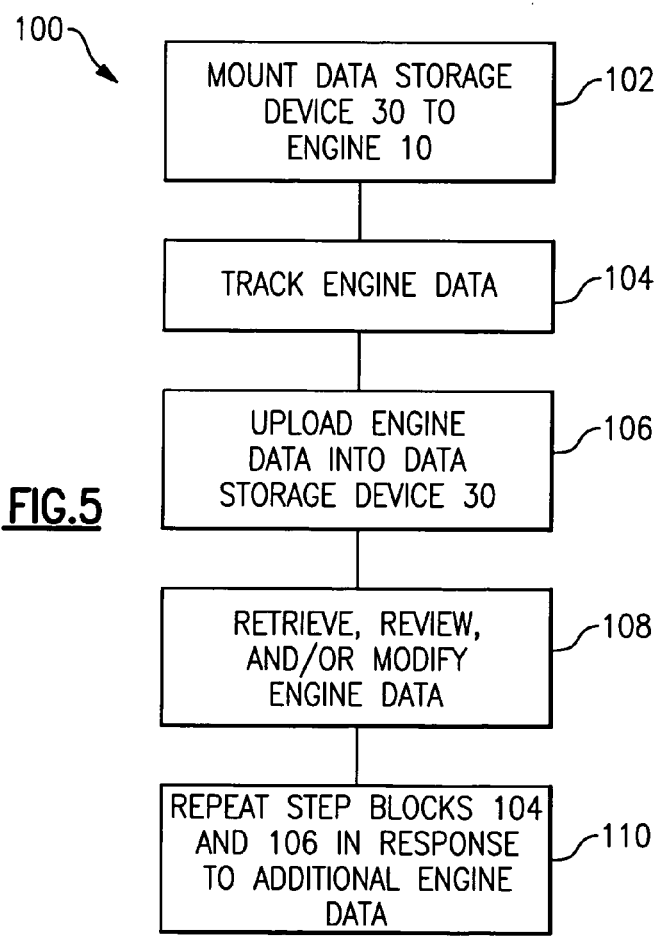
FIG. 5 illustrates a block diagram illustrating a method of recording the life history of a gas turbine engine.

A method 100 for recording the life history of a gas turbine engine 10 is illustrated with respect to the block diagram shown in FIG. 5. At step block 102, the data storage device 30 is mounted to the gas turbine engine 10. It is desirable to retain the data storage device 30 with its corresponding gas turbine engine 10 during the entire life of the engine 10. At step block 104, engine data is tracked. For example, an engine maintenance log may be created on the peripheral device 38 and the engine data, including engine history data and engine parts data, may be recorded within the engine maintenance log.

At step block 106, the engine data is uploaded onto the data storage device 30. In one example, the engine data is entered on the peripheral device 38 and the peripheral device 38 is connected to the data storage device 30. The engine data is then communicated from the peripheral device 38 to the data storage device 30. In another example, the engine data is entered onto the peripheral device 38 and the engine data is subsequently wirelessly communicated from the peripheral device 38 to the data storage device 30. It should be understood that the exchange of information between the peripheral device 38 and the data storage device 30 may be achieved in any known manner. Alternatively, information may be directly exchanged between the engine parts 100 and/or the engine controllers 200 and the data storage device 30.

At step block 108, the engine data stored on the data storage device 30 may be retrieved, reviewed and/or modified. For example, the peripheral device 38 may be connected to the data storage device 30 such that engine data may be exchanged in a similar manner as discussed with respect to step block 106. Finally, at step block 110, additional engine data is recorded within the data storage device 30 each time new engine data is tracked at step block 104. That is, step blocks 104 and 106 are repeated as required to ensure that the engine data stored on the data storage device 30 is completely updated.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

What is claimed is:

1. A on-engine data storage device for a gas turbine engine, comprising:
   a housing;
   an interface device that is configured to communicate with a peripheral device;
   a memory device mounted within said housing and operable to store engine data that includes at least maintenance information including maintenance activities that have been performed over a life history the gas turbine engine; and
   a sensor system that selectively limits access to said engine data stored on said memory device, said sensor system including at least a biometric authentication system.

2. The device as recited in claim 1, wherein said engine data includes at least one of engine history data and engine parts data.

3. The device as recited in claim 1, comprising a microcontroller, an antenna, a transceiver and a receiver mounted within said housing and connected to said memory device to communicate with the peripheral device by wireless transmissions.

4. The device as recited in claim 1, including a peripheral device, said peripheral device being at least one of a cellular phone and a computer.

5. The device as recited in claim 1, wherein said memory device includes at least one of a hard drive, RAM, ROM, magnetic storage and an integrated circuit.

6. The device as recited in claim 1, wherein said interface device comprises a universal serial bus (USB).

7. An on-engine data storage device for a gas turbine engine, comprising:
   a data storage device housing;
   a memory device mounted within said data storage device housing, wherein said memory device is operable to store engine data that includes at least maintenance information and engine parts data; and
   a part tracking system in communication with an engine part located on the gas turbine engine externally from said data storage device housing and having an electronic identifier including information related to said engine part, wherein said part tracking system is configured to collect the information including at least a part number of said engine part that is stored in said memory device as part of said engine parts data.

* * * * *